(12) United States Patent
Blaum et al.

(10) Patent No.: US 7,116,736 B2
(45) Date of Patent: Oct. 3, 2006

(54) METHOD, SYSTEM, AND PROGRAM FOR SYNCHRONIZATION AND RESYNCHRONIZATION OF A DATA STREAM

(75) Inventors: Mario Blaum, San Jose, CA (US); Glen Alan Jaquette, Tucson, AZ (US); Brian Harry Marcus, Los Altos, CA (US); Constantin Michael Melas, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 10/038,163

(22) Filed: Jan. 2, 2002

(65) Prior Publication Data

US 2003/0123587 A1 Jul. 3, 2003

(51) Int. Cl.
*H04L 7/00* (2006.01)
*H03M 7/00* (2006.01)
*H03M 13/00* (2006.01)

(52) U.S. Cl. .......................... 375/354; 341/59; 341/94
(58) Field of Classification Search ................ 375/240, 375/242, 253, 354; 341/59, 60, 94; 360/47, 360/53
See application file for complete search history.

(56) References Cited

U.S. PATENT DOCUMENTS

| | | | |
|---|---|---|---|
| 4,933,786 A | 6/1990 | Wilson | |
| 5,291,499 A | 3/1994 | Behrens et al. | |
| 5,341,387 A | 8/1994 | Nguyen | |
| 5,521,945 A | 5/1996 | Knudson | |
| 5,635,933 A | 6/1997 | Fitzpatrick et al. | |
| 5,661,760 A | 8/1997 | Patapoutian et al. | |
| 5,757,294 A | 5/1998 | Fisher et al. | |

(Continued)

FOREIGN PATENT DOCUMENTS

EP 0517483 12/1992

(Continued)

OTHER PUBLICATIONS

Fredrickson, L. "Synchronization Sequence Detection Using a Modified Trellis Code Viteribi Detector", *IBM Technical Disclosure Bulletin*. vol. 38, No. 6, Jun. 1995. pp. 145-150.

(Continued)

*Primary Examiner*—Young T. Tse
(74) *Attorney, Agent, or Firm*—David W. Victor; Konrad Raynes & Victor LLP (57) ABSTRACT

Provided is a method, system, and program for providing synchronization in a binary data stream. A binary data stream is received. A synchronization mark having at least one isolated peak is generated into at least one point in the data stream. An encoded data stream is formed by concatenating the synchronization mark with the received binary data. During decoding, the synchronization mark is detected based on error propagation occurring adjacent to the at least one isolated peak of the synchronization mark.

38 Claims, 5 Drawing Sheets

U.S. PATENT DOCUMENTS

| | | | | |
|---|---|---|---|---|
| 6,097,320 | 5,757,822 | | 5/1998 | Fisher et al. |
| | 5,771,248 | * | 6/1998 | Katayama et al. |
| ....... 714/763 | 5,838,738 | | 11/1998 | Zook |
| | 5,844,507 | | 12/1998 | Zook |
| | 5,969,649 | * | 10/1999 | Ashley et al. |
| ......... 341/59 | 5,999,110 | * | 12/1999 | Blaum et al. |
| ......... 341/59 | 6,014,276 | | 1/2000 | Takase |
| | 6,018,304 | | 1/2000 | Bessios |
| | 6,021,011 | | 2/2000 | Behrens et al. |
| | 6,032,284 | | 2/2000 | Bliss |
| | 6,046,691 | | 4/2000 | Aziz et al. |
| | 6,072,410 | | 6/2000 | Kim |
| | A | | 8/2000 | Kuki et al. |
| 6,097,321 | A | | 8/2000 | Sayiner |
| 6,115,198 | A | | 9/2000 | Reed et al. |
| 6,119,265 | A | | 9/2000 | Hara |
| 6,130,629 | A | | 10/2000 | Aziz et al. |
| 6,150,964 | A | | 11/2000 | McLaughlin |
| 6,157,325 | A | | 12/2000 | Kahlman et al. |
| 6,184,806 | B1 | | 2/2001 | Patapoutian et al. |
| 6,185,175 | B1 | | 2/2001 | Zook |
| 6,429,986 | B1 | | 8/2002 | Blaum et al. |
| 6,930,619 | B1 | * | 8/2005 | Shim et al. .................... 341/59 |

FOREIGN PATENT DOCUMENTS

| | | |
|---|---|---|
| EP | 0751522 | 1/1997 |
| EP | 0764950 | 3/1997 |
| JP | 10027433 | 1/1998 |
| WO | 9418670 | 8/1994 |
| WO | 9708836 | 3/1997 |
| WO | 9716011 | 5/1997 |

OTHER PUBLICATIONS

McLaughlin, S. W., P. Lee, and R. Cloke. "Codes for Improved Timing Recovery in *PR4* and *EPR4* Magnetic Recording", *GLOBECOM 97. IEEE Global Telecommunications Conference.* vol. 3, 1997. p. 1235-9. (*Abs.*).

McLaughlin, S.W., P. Lee, R. Cloke, and B.V. Vasic. "One-Pairs Codes for Partial Response Magnetic Recording", *IEEE Transactions on Magnetics*, vol. 35, No. 3, May 1999. pp. 2080-2086.

U.S. Appl. No. 10/037,753, filed on Jan. 2, 2003, entitled, "Method and Apparatus for Encoding data to Guarantee Isolated Transitions in a Magnetic Recording System", invented by M. Blaum, G.A. Jacquette, B.H. Marcus, and C.M. Mela.

IBM Technical Disclosure Bulletin, "Rate 16/17 (0,6/6) Code." IBM Corp. New York, USA. vol. 31, No. 8, 1989, pp. 21-23.

Yasuda, T., et al. "Byte Synchronization System and Method Using an Error-Tolerant Synchronization Pattern for the PR IV Channel." IEEE Transactions on Magnetics, IEEE Inc. New York, USA. vol. 34, No. 4, Part 1, Jul. 1998, pp. 1922-1924.

PCT/EP02/14563, International Search Report mailed Aug. 21, 2003.

PCT International Preliminary Examination Report, International Application No. PCT/EP02/14563, Mar. 30, 2004.

Response to Communication dated May 23, 2005, Application No. 02793083.3-1247, Applicant IBM Corp., Ref. TUC920010036, dated Sep. 26, 2005.

Communication pursuant to Article 96(2) EPC, Application No. 02793083.3-1247, Applicant IBM Corp., Ref. TUC920010036, dated May 23, 2005.

* cited by examiner

METHOD, SYSTEM, AND PROGRAM FOR SYNCHRONIZATION AND RESYNCHRONIZATION OF A DATA STREAM

RELATED APPLICATIONS

This application is related to the copending and commonly assigned United States patent application entitled "Method and Apparatus for Encoding Data to Guarantee Isolated Transitions in a Magnetic Recording System", having U.S. application Ser. No. 10/037,753, which patent application was filed on Jan. 2, 2005 and is incorporated herein by reference in its entirety.

BACKGROUND OF THE INVENTION

1. Field of the Invention

The present invention relates to a method, system, and program for synchronization and resynchronization of a data stream.

2. Description of the Related Art

In data recording systems, a data drive writes positive and negative "flux transitions" to a storage medium using encoding schemes known in the art, and a decoder is used to read back the encoded data stored on the storage medium. A "one" bit ("1") represents a peak or trough in the signal while a "zero" bit ("0") indicates no peak. Data to be provided to a recording channel or decoder is a sequential string of bits, to be recorded or readback on/from the recording media as transitions. In the prior art, a data set will include a VFO ("Variable Frequency Oscillator) pattern at a specific location (a header) and a particular known transition frequency to synchronize a read clock (such as a phase locked loop ("PLL")) to the codeword bit frequency. The VFO pattern may comprise repetitive codeword pattern, such as a sequence of "10" or 2T bits, but which is identifiable because of its location in a header. A known synchronization mark is also provided between the VFO pattern and any encoded data to allow the decoder to align to the codeword boundaries and to the start location of the incoming data.

If the PLL does not achieve complete phase lock, or if the decoder does not align to the codeword boundaries on the incoming data, then the decoder will not be able to successfully decode incoming encoded data until the next synchronization ("sync") or resynchronization ("resync") pattern is encountered, usually in the header of the next data set or in a header for a grouping of codeword groups. When a synchronization pattern is not detected (missed) or detected erroneously in the wrong position (e.g., due to a defect), the exact bit position and alignment to codeword boundaries is not known. Accordingly, the decoder will not be able to successfully decode the encoded data unless or until some further sync field is encountered, such as the next sync or resynchronization. Such a failure to decode may result in infinite error propagation, which is a catastrophic type of failure.

Even though the location of the VFO pattern and the synchronization mark are known, misdetection of one or more bits in the synchronization mark may prevent recognition of the synchronization mark. Without proper recognition of the synchronization mark, the data detector will not be in-sync with the recorded data and will not recognize the data.

In the prior art, data errors are addressed using error correcting codes. Such codes allow detection and correction of many data recording errors. However, errors in the VFO or synchronizing patterns may result in missing detection of the synchronization mark or detecting it in the wrong place. Therefore, the data detection may begin with reading data before or after the data really starts. If the start of data is not determined via detection of the synchronization mark, all data between one synchronization mark and a subsequent synchronization mark which is detected successfully will be lost. This may have a catastrophic effect, rendering useless the error correcting codes protecting the data.

In the commonly assigned U.S. Pat. No. 5,999,110, a method is disclosed based on using an encoded synchronization mark concatenated with a VFO pattern wherein the encoded synchronization mark is set at a maximum Hamming distance from the concatenated VFO for the number of bits in the fixed plurality of bits. However, in certain applications, such as an Enhanced Partial Response Type 4 (EPR4) waveform, the maximum Hamming distance measurements are less effective because errors tend to propagate between peaks.

Thus, there is a need in the art to provide more sophisticated synchronization and resynchronization methods to reduce errors in data encoding systems.

SUMMARY OF THE PREFERRED EMBODIMENTS

Provided is a method, system, and program for achieving synchronization in a binary data stream. A binary data stream is received. A synchronization mark having at least one isolated peak is generated into at least one point in the data stream. An encoded data stream is formed by concatenating the synchronization mark with the received binary data. During decoding, the synchronization mark is detected based on error propagation occurring adjacent to the at least one isolated peak of the synchronization mark.

In further implementations, the received binary data stream is concatenated with at least one resynchronization mark, wherein the at least one resynchronization mark is located in the middle of the received binary data stream and the resynchronization mark and the encoded binary data are different.

The resynchronization mark is detected to verify that the decoding process is operating correctly.

In still further implementations, a data section of the received binary data stream is encoded at an encoded rate of m/n and the resynchronization mark comprises a fixed plurality of bits equivalent to bytes of the encoded binary data.

The described implementations provide a technique to provide improved decoding of data by locating synchronization and resynchronization marks in the data stream to improve the detection of the data section in the received binary data stream.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
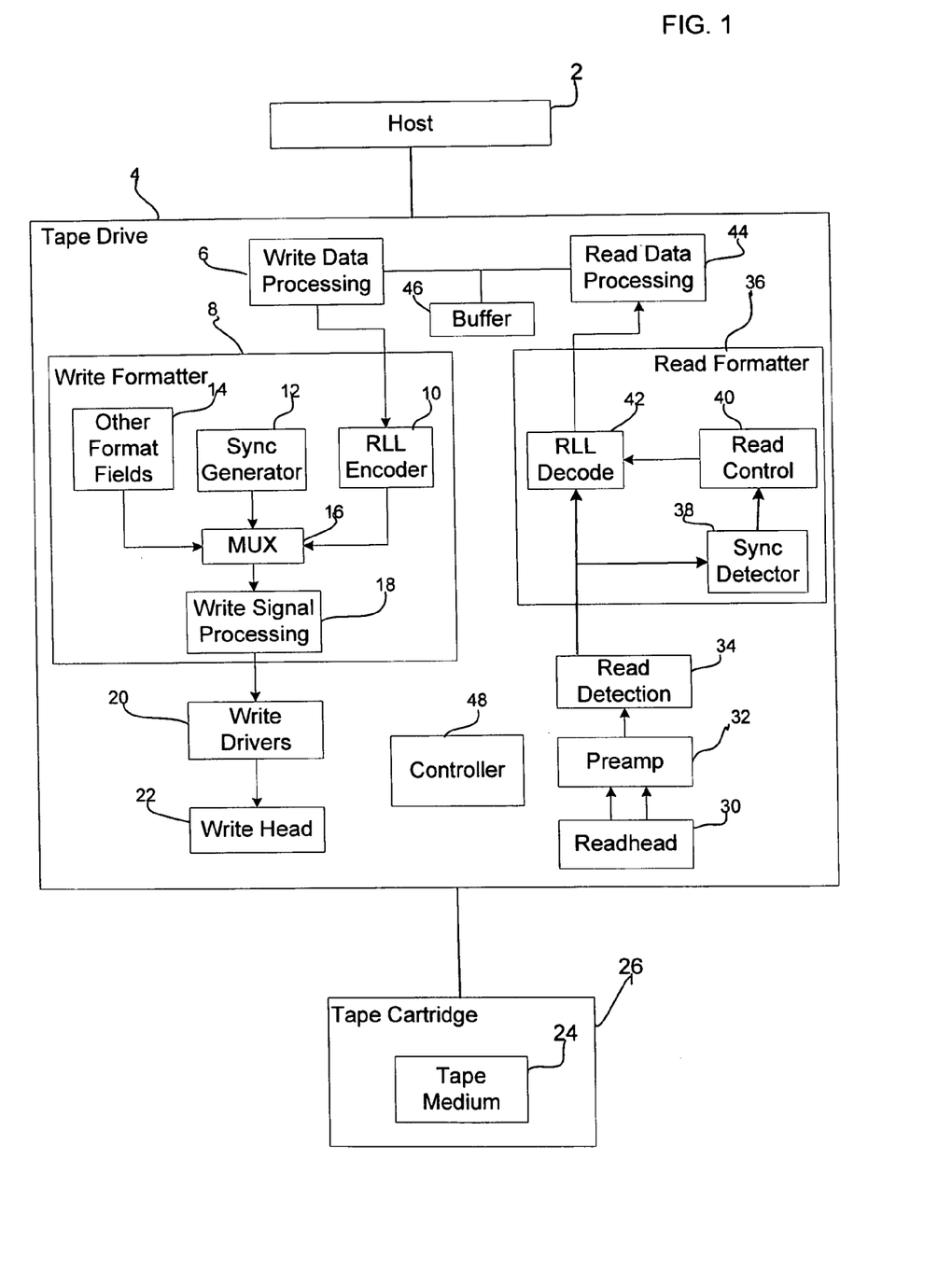
FIG. 1 illustrates an architecture of components in a tape drive to encode and decode data in which aspects of the invention are implemented.

FIG. 1 illustrates a tape storage environment in which aspects of the invention are implemented. A host system 2 is in communication with a tape drive 4. The host system 2 would include a storage interface or adaptor card (not shown), such as a Small Computer System Interface (SCSI), Fibre Channel, iScsi, etc., and the tape drive 4 would also include an adaptor card, where the adaptor cards enable communication between the devices. The tape drive 4 would further include write data processing logic 6 comprising circuits which process data received from host 2 into data which will be written to tape. The write data processing logic 6 may include circuitry for data compression, Error Correction Code (ECC) encoding, and division of the data into blocks to be written to tape. Data from the write data processing logic 6 is then sent to a write formatter 8 that includes circuitry to perform run length limited (RLL) encoding of the data, add format fields as necessary, and include synchronization marks. Specifically, the RLL encoder 10 converts the processed data into an RLL encoded bit stream, the sync generator 12 generates the synchronization marks which are added to the data stream, and the other format fields 14 that generates all other format fields such as Data Set Separators (DSS), Voltage Controlled Oscillator (VCO) lock fields, headers, etc. Some format fields may be multiplexed into the data before the RLL encoder (e.g. the headers). A multiplexor (MUX) 16 is controlled to add the synchronization fields and other format fields to the RLL encoded bit stream as necessary per the logical format to be written to tape. The write signal processing 18 circuitry performs further processing on the RLL encoded bit stream, such as write equalization, etc. From there, the signal passes to write driver circuits 20 that drive the write heads 22 in response to a signal to be written. The write head 22 contains the actual write elements (e.g. inductive write elements). The data is written to a tape medium 24 within a tape cartridge 26.

A read head 30 contains the actual read elements (e.g. Magneto-Resistive (MR) read elements) to read data blocks from the tape medium 24. A preamplifier 32 may include a read head bias circuit, analog filtering, gain control circuitry, etc., to preamplify the read data signal. A read detection circuit 34 performs all processing necessary to extract the clock and data from the preamplified signal. The read detector 34 may include a Phased Locked Loop (PLL) circuit (not shown) to extract the clock signal. If the PLL is of the VCO type, then the PLL in the read detection circuitry 34 will generate a clock in exact phase lock with the input data. If the PLL is of the asynchronous kind, then the PLL will generate a valid signal which effectively is a gate or enable signal to be processed in association with another clock which is typically fixed and asynchronous to the input data stream. The result of the PLL processing is a virtual clock which is phase locked to the input data stream. In either case, the result of the read detection 34 processing is data (e.g. from a Viterbi trellis if PRML detection is being performed) and a clock. The data and clock are sent to a read formatter 36.

The read formatter circuit 36 synchronizes at a format level to the detected data to enable RLL decoding and format field stripping. The sync detector circuit 38 scans the detected data for a synchronization mark. A read control circuit 40 determines which synchronization detections to use. This circuit may elect to ignore synchronization detections which occur at certain times (e.g. too close to the previous one), or infer where a missed sync mark should have been (e.g. based on timing a given number of clocks from a previous sync mark). The read control circuit 40 controls an RLL decode circuit 42 to decode all RLL encoded data. Only the processed data is forwarded to read data processing 44 (e.g. the headers might be RLL decoded but they are effectively stripped before read data processing begins). The read data processing 44 circuitry may include ECC correction, data decompression, etc. The result of the read data processing 44 is data restored to the form in which the host 2 sent it to the drive. A buffer 46 buffers data on both reads and writes for the tape driver 4, such as when 'streaming' data to tape. The buffers used on read and write may be separate or shared (as shown). A controller 48 coordinates the overall tape drive 4 operation.

In alternative implementations, the encoding and decoding logic may be implemented in other types of storage devices, such as a hard disk drive, optical disk drive or other device for reading and writing data to a non-volatile storage medium. In the described implementations, the tape medium 24 comprises a magnetic tape (e.g., Linear Tape Open, Travan, etc.) or digital tape.

The write head 22 writes the encoded binary bit stream, in the form of flux transitions, to the tape medium 24. To retrieve data from the tape medium 24, the read head 30 reads the encoded data from the tape medium 24, which is then decoded by the read formatter 36, which provides the output binary data to return to the host 2. If the errors when reading do not exceed the error-correcting capability of the codes used for synchronization and error-control, the binary output data from the read data processing 44 will coincide with the binary input data from the host 2.

In certain implementations, the input at the write head 22 and the read head 30 are asynchronous. Thus, the data stream into the read channel must provide the clocking necessary to allow the read head 30 to correctly interpret the transitions of the stored data so that read formatter 36 may decode the channel output data.

As discussed, the write formatter 8 adds headers having clocking information to each data set and arranges the encoded data, sync signals, etc., in a desired format. The clocking information may then be utilized by the read head 30 to identify the position of each of the transitions in the encoded data and supply that information to the read formatter 36 for decoding the encoded data. The output signal patterns from the read head 30 are also supplied to a sync detector 38 which detects the synchronization patterns in the binary data read from the tape medium 24. Read formatter 36 uses detected synchronization marks to determine which of the decoder output is data.

Figure 2:
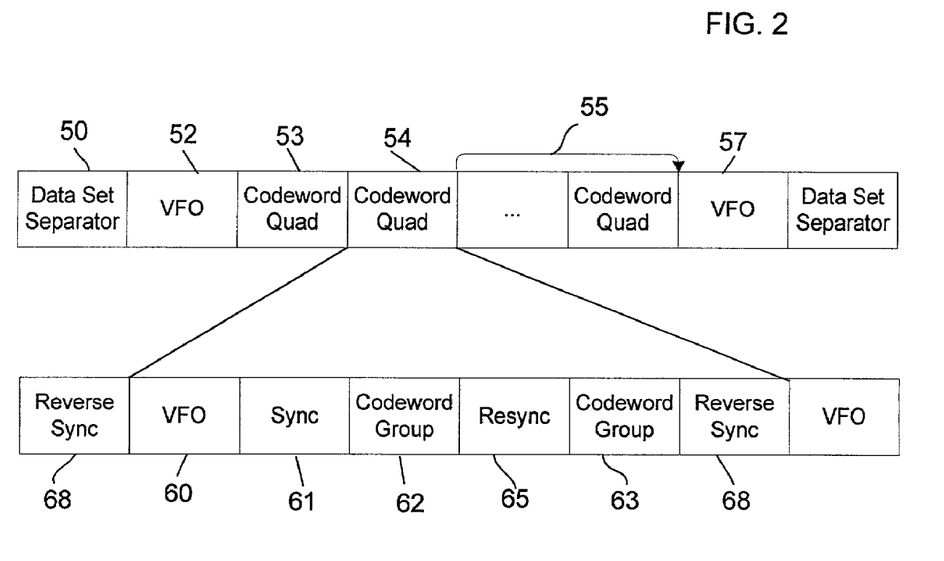
FIG. 2 illustrates the recording or channel format of encoded data sets employing the synchronization and resynchronization marks in accordance with implementations of the invention.

FIG. 2 illustrates the recording or channel format of encoded data sets employing the synchronization and resynchronization marks in accordance with implementations of the invention. Each data set is separated by a data set separator, or gap 50. When the data is recorded by a magnetic tape drive, the gap is typically called the "IBG" or interblock gap. The gap is sometimes followed by a variable frequency oscillator (VFO) area 52, which is utilized by to synchronize the data frequency to that of the VFO area. In data recording, the tape drive 4 may operate at various speeds, or may stop and restart or reverse direction, therefore causing changes in the data frequency, which must be determined by detecting the VFO area frequency. The VFO area 52 is then followed by the encoded data 53–55 quadrants, and, in tape drives that may move forward or backwards, such as magnetic tape, a backwards VFO area 57.

In the described implementations, a grouping of codeword groups, or codeword quad 54, is expanded and shown in greater detail in FIG. 2. Each codeword quad includes a header with a leading VFO pattern 60 and a synchronization mark 61, a plurality of codeword groups 62–63, separated by a resynchronization mark 65, and having a "Reverse Sync" pattern 68 for magnetic tape, at the end of the quad, adjacent to the next VFO pattern. Each of the codeword groups 62–63 may be of any suitable length. It is also preferable that the VFO pattern 60 be encountered before the synchronization mark 61 and concatenated therewith, so that the frequency may be adjusted before the decoder is aligned to the synchronization mark. The described implementations may be configured to read and write in both directions by writing the synchronization mark 61 in the opposite side of the VFO pattern and in reverse order, and concatenated with the trailing VFO pattern. Thus, the reverse sync 68, the VFO 60 and the next synchronization mark 61 may be concatenated in a sequential string.

The VFO pattern 60 is a repetitive high frequency codeword pattern and identifiable as a result of being located in a header. The VFO pattern 60 provides a short pattern in which the clock or PLL may adjust the operating frequency to that of the VFO area 52 (phase-lock). The VFO pattern 60 must be sufficiently long, however, that the frequency can be detected and locked.

The synchronization mark or pattern 61 is provided to allow the sync detector 38 to determine the start of encoded data, aligning it to the codeword boundaries. Because the synchronization mark is always adjacent to a VFO pattern (as opposed to a resynchronization mark which is not), the synchronization mark is readily detected following the VFO pattern. The location of the synchronization mark largely eliminates any concern that it will be seen in encoded data.

Errors in the VFO and/or synchronizing patterns may result in finding the synchronizing pattern in the wrong place, with the consequence that the recording read channel begins supplying "data" before or after the data actually starts. This would cause the RLL decode 42 to operate out of synchronization, thereby preventing any of the supplied "data" from being decoded. One error occurring in data recording systems is a "bit shift," where the inter-symbol interference of high frequency signals shifts the detection of any transition away from an adjacent transition and towards a long string of no transitions (many "0s" between the transitions). This causes the detection circuitry to shift the transitions of longer spans into different positions such that they may instead be erroneously detected as shorter patterns.

Another error is that one transition occurs too slowly to form a strong signal when read, and therefore does not meet a minimum detection threshold of a peak detector. Thus, the transition is missed completely. Still another error results from defects in the media which results in a dramatic loss of signal amplitude and change of transfer function for a length of the track on which the data is recorded.

In the described implementations, an error detection algorithm based on runs of consecutive errors between peaks of a synchronization mark is disclosed which would prevent the errors discussed above. The algorithm according to the described implementations utilizes a synchronization mark consisting of isolated peaks. Isolated peaks are used because the peaks act as natural bafflers against the most likely type of error propagation found in decoding EPR4 ("Extended Partial Response") type of waveforms. In one implementation using a 16/17 encoding rate, a 17-bit synchronization symbol S may be used, such as S =01000010000101000, which is appended to the VFO. Alternative synchronization symbols may be generated into the data stream. Generating synchronization symbols (S) before the data in the data stream enables the RLL decode 42 to detect the point at which data decoding begins in the data stream. In certain implementations, the synchronization symbol is appended to the VFO to obtain:

$$S'=1001000100001010001.$$

Because the first two bits (10) of S' are already in the VFO, seventeen bits, instead of 19, are appended to the VFO, which is equivalent to two bytes in a 16/17 code rate. In this way, the propagation peak is exploited to incorporate the synchronization symbol into a propagation peak. The value of the synchronization symbol (S') can be generated in alternative manners. After S' has been determined, the data can be located and read because the data begins following the synchronization mark. In addition, since the data may also be read in the reverse direction, the synchronization mark is also recorded in the reverse direction after the encoded data. As a result, no portion of the synchronization mark is likely to be confused with the VFO pattern, and the synchronization mark is unlikely to be recognized until the full pattern is actually encountered. Thus, if a valid synchronization mark is encountered before encoded data is, it will likely be recognized in the correct location.

Common errors occurring in the VFO appended synchronization S' involve bursts with an even number of "1s" between peaks. In addition, an error pattern of type "101" around a peak is also common. Possible error patterns that may occur are:

1111000000000000000

0000000001111000000

0000011000000011110

0010100000000000000

Thus, in accordance with the present invention, the read formatter 36 should be capable of recognizing the commonly occurring error patterns as such.

In the described implementations, the binary stream received by the RLL decode 42 includes the VFO field 101010 followed by the synchronization mark, and then by the data encoded using a 16/17 rate code, such as the rate code disclosed in the related patent application entitled "Method and Apparatus for Encoding Data to Guarantee Isolated Transitions in a Magnetic Recording System,"

having U.S. application Ser. No. 10/037,753 and which patent application was incorporated herein by reference in its entirety above, wherein each codeword staffs and ends with no more than three zeros and three ones, where two patterns 101010101 and 010101010 are excluded and each codeword contains a peak 010. To encode the EPR4 waveform, the binary stream is precoded by multiplying the binary stream by $1/(1 \oplus D)$, (where D is a delay operator) and then convolving the binary stream with $(1 -D)(1 +D^2)$ to obtain the EPR4 waveform in a manner known in the art. To decode the EPR4 waveform, a Viterbi decoding algorithm is applied to a possibly noisy version of the waveform, and the result of the Viterbi algorithm is postcoded by convolving the result of the algorithm with $1 \oplus D$.

Figure 3:
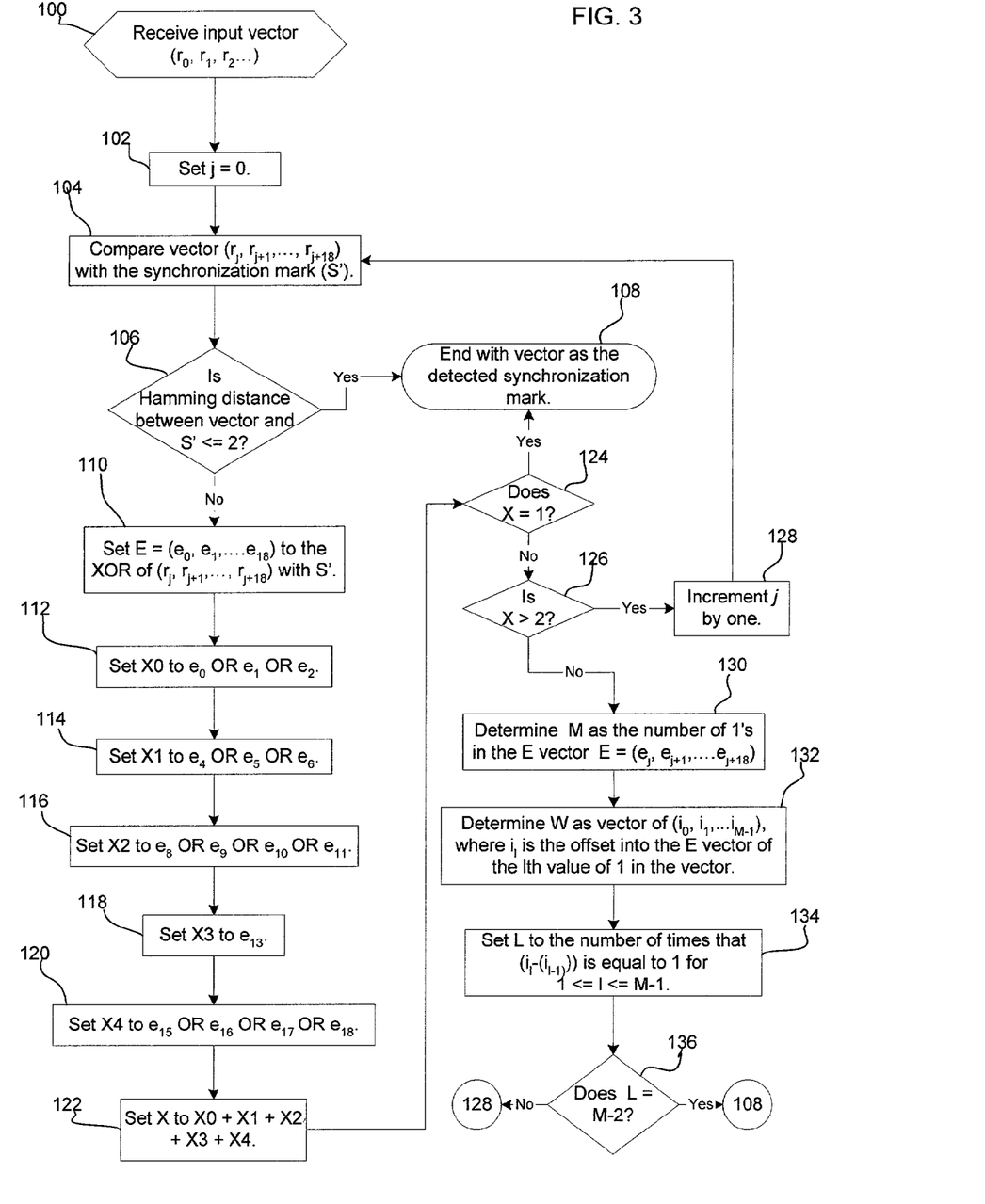
FIG. 3 illustrates logic to detect a synchronization mark in a data stream in accordance with implementations of the invention.

FIG. 3 illustrates logic implemented in the sync detector 38 to detect a synchronization mark in the received binary vector $(r_0, r_1, r_2, \ldots)$. In described implementations, the synchronization mark includes at least one peak, such as a "010". With respect to FIG. 3, control begins at block 100 upon receiving an input binary vector $(r_0, r_1, r_2 \ldots)$, where each $r_j$ is a binary value for the jth item in the received input vector. The sync detector 38 initializes (at block 102) j to zero. A considered section of the input vector $(r_j, r_{j+1}, \ldots, r_{j+18})$ is compared with the synchronization symbol (S'), where S'=1001000100001010001, to determine (at block 104) the Hamming distance therebetween, which is the number of bit locations in each vector that differ. If (at block 106) the determined Hamming distance between the considered section of the input vector $(r_j, r_{j+1}, \ldots, r_{j+18})$ and the synchronization symbol (S'=1001000100001010001) is less than or equal to two, then the considered section of the input vector $(r_j, r_{j+1}, \ldots, r_{j+18})$ is deemed (at block 108) to be the synchronization symbol within the received binary vector. Otherwise, if (at block 106) the Hamming distance is greater than two, then an error vector E is calculated (at block 110) as the exclusive or (XOR) of the considered section of the input vector $(r_j, r_{j+1}, \ldots, r_{j+18})$ and the synchronization symbol (S'=1001000100001 010001), resulting in the vector $(e_0, e_1, \ldots, e_{18})$. A value X0 is set (at block 112) to the disjunction (OR) of $e_0 \vee e_1 \vee e_2$. The value X1 is set (at block 114) to the disjunction of (OR) of $e_4 \vee e_5 \vee e_6$. The value X2 is set (at block 116) to the disjunction (OR) of $e_8 \vee e_9 \vee e_{10} \vee e_{11}$. The value X3 is set (at block 118) to $e_{13}$. The value X4 is set (at block 120) to the disjunction (OR) of $e_{15} \vee e_{16} \vee e_{17} \vee e_{18}$. The variable X is then set (at block 122) to the sum of X1, X2, X3, and X4.

If (at block 124) X1 is equal to one, then control proceeds to block 108 to deem the considered section of the input vector $(r_j, r_{j+1}, \ldots, r_{j+18})$ as synchronization mark in the input vector. Otherwise, if (at block 126) X is greater than two, then j is incremented (at block 128) by one and control proceeds back to block 104 to consider the next section of the input vector, shifted to the right by one bit. Otherwise, if (at block 126) X is equal to two, then the variable M is determined (at block 130) as the number of bit values in the error vector (E) that is one. The vector W of $(i_0, i_1, \ldots i_{M-1})$ is determined (at block 132), such that $i_k$ is the offset into the considered section of the input vector $(r_j, r_{j+1}, \ldots, r_{j+18})$ of the kth value of one. For instance, for the vector 10101, $i_0$ is 0, $i_1$ is 2, and $i_2$ is 4. The sync detector 38 then sets (at block 134) the variable L to the number of times that $(i_k - i_{k-1})$ is equal to one for $1 \leq k \leq M-1$. If (at block 136) L is equal to M-2, then control proceeds to block 108 to accept the currently considered section $(r_j, r_{j+1}, \ldots, r_{j+18})$ as the synchronization mark, otherwise, control proceeds to block 128 to consider the next possible synchronization mark in the received input data. From the synchronization mark, the read formatter 30 can access a block of data to decode as the bits following the synchronization mark comprise a block of data.

In addition to synchronization symbols, resynchronization marks 65 are generated into the middle of data to verify that the correct data is being read. Unlike synchronization symbols, resynchronization marks 65 are not preceded by a VFO to indicate the start of the resynchronization pattern 65. Thus, the location of the resynchronization mark 65 must have additional safeguards to avoid being seen as encoded data. In certain implementations, the resynchronization mark 65 is equivalent to approximately four bytes of data. In one embodiment using a 16/17 encoding rate, a 34-bit Resynchronization mark RS is used, such as RS=1000000000100000000001000000000001. The RS symbol is given for illustration purposes only, wherein other symbols may also be used. However, with the described implementations, the resynchronization mark 65 is unlikely to be mistaken for encoded data. Therefore, depending on the encoding protocol, the resynchronization mark is selected to avoid confusion with actual data.

In order to detect the resynchronization mark RS, the following algorithm is used in conjunction with the RS mentioned above located in between data encoded with the same 16/17 code used with the synchronization operation (i.e. wherein each codeword starts and ends with no more than three zeros and three ones, where two patterns 101010101 and 010101010 are excluded and each codeword contains a peak 010).

Figure 4:
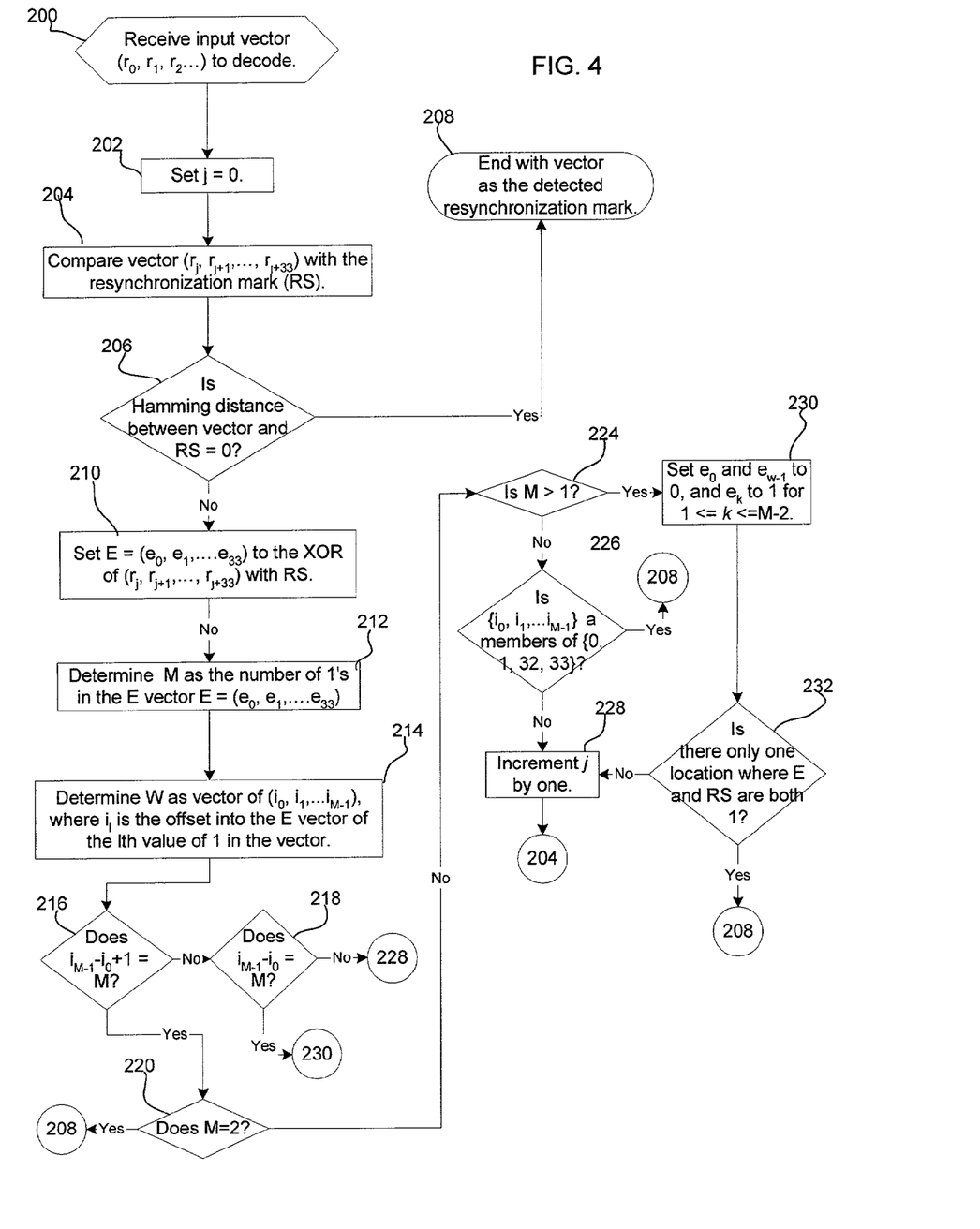
FIG. 4 illustrates logic to detect a resynchronization mark in accordance with implementations of the invention.

FIG. 4 illustrates logic implemented in the sync detector 38 to detect the resynchronization (RS) code. The logic of FIG. 4 assumes a 34 bit resynchronization mark of 1000000000100000000001100000000001. With respect to FIG. 4, control begins at block 200 upon reading an input binary vector $(r_0, r_1, r_2 \ldots)$, where each $r_j$ is a binary value for the jth item in the received input vector. The sync detector 38 initializes (at block 202) j to zero. A section of the input vector $(r_j, r_{j+1}, \ldots, r_{j+33})$ for a given j is compared with the resynchronization symbol (RS=1000000000100000 00001000000000001) to determine (at block 206) the Hamming distance between the two, which is the number of bit locations in each vector that differ. If (at block 206) the determined Hamming distance between the section of the input vector $(r_j, r_{j+1}, \ldots, r_{j+18})$ and the resynchronization symbol (RS=1000000000100000000 0001000000000001) is zero, then the considered section of the input vector $(r_j, r_{j+1}, \ldots, r_{j+33})$ is deemed (at block 208) to be the resynchronization symbol (RS) within the vector being read. Otherwise, if (at block 206) the Hamming distance is not zero, then an error vector E is calculated (at block 210) as the exclusive or (XOR) of the considered section of the input vector $(r_j, r_{j+1}, \ldots, r_{j+33})$ and the resynchronization symbol (RS), resulting in the vector $(e_0, e_1, \ldots, e_{33})$.

At block 212, the variable M is determined as the number of bit values in the input vector $(r_j, r_{j+1}, \ldots, r_{j+33})$ that are one. The vector W is determined (at block 214) of $(i_0, i_1, \ldots i_{M-1})$, such that $i_k$ is the offset into the considered section of the input vector $(r_j, r_{j+1}, \ldots, r_{j+33})$ of the kth value of one. For instance, for the vector 10101, $i_0$ is 0, $i_1$ is 2, and $i_2$ is 4. If (at block 216) $((i_{M-1} - i_0)+1)$ is M and if (at block 220 equals two, then control proceeds to block 208 to accept the input vector as the resynchronization mark. If (at block 220) M is not 2 and if (at block 222) M>1, then in the (E) vector, $e_0$ and $e_{w-1}$ are set (at block 230) to 0 and $e_k$ is set to 1 for $1 \leq k \leq (M-2)$. If (at block 232) there is only one bit location in the modified error E vector and the resynchronization symbol (RS) where both are one, then control proceeds to block 208 to accept the input vector as the resynchronization symbol. Otherwise, j is incremented (at block 228) by one and control proceeds back to block 204 to shift over in the received input vector by one bit to consider the next possible thirty four bits as the resynchronization mark. If (at block 224) the values in the W vector ($i_0, i_1, \ldots i_{M-1}$) are members of the set $\{0, 1, 32, 33\}$, then control proceeds to block 208 to accept the considered vector as the resynchronization mark. Otherwise, control proceeds to block 228 to consider the next possible resynchronization mark in the received input vector. If (at block 216) (($i_{M-1}-i_0$)+1) is not M and if (at block 218) ($i_{M-1}-i_0$) is M, then control proceeds to block 230, otherwise, control proceeds to block 228 to increment j and consider the next possible resynchronization mark in the received input vector ($r_0, r_1, r_2 \ldots$)

Figure 5:
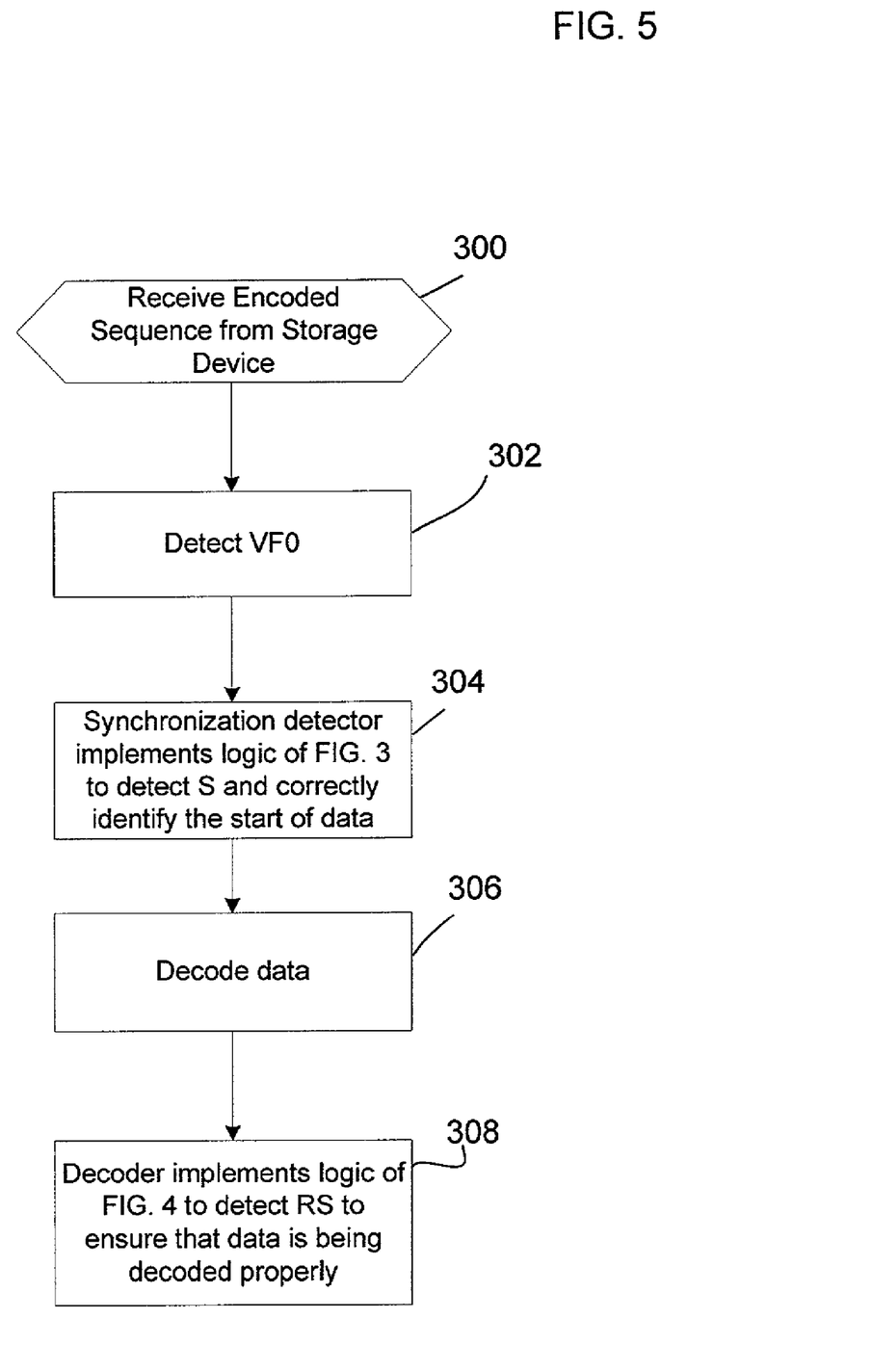
FIG. 5 illustrates logic to utilize the logic of FIGS. 3 and 4 when decoding data in accordance with implementations of the invention.

FIG. 5 illustrates how the sync detector 38 implements bit synchronization and resynchronization in accordance with implementations of the invention. The logic begins at block 300 where the read formatter 36 receives an encoded sequence of bits from the tape medium 24. The sync detector 38 will seek to detect (at block 302) the VFO pattern in the encoded sequence of bits. Once the VFO is detected the sync detector 38 executes the logic of FIG. 3 to detect the synchronization mark S (at block 304). By identifying the synchronization mark (S) to correctly identify the beginning of the user data. While the sync detector 38 is reading the data (at block 306), the sync detector 38 seeks to identify any resynchronization marks (RS) to verify the data is being read correctly. The sync detector 38 would execute the logic of FIG. 4 (at block 308) to identify the resynchronization (RS) pattern and test whether data is properly interpreted.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described implementations provide a technique for transferring data to a tape drive. The above described logic may be used with other input/output (I/O) devices or other storage devices, e.g., optical tape, magnetic tape, magnetic disk, etc.

In the described implementation, the preferred algorithms were shown based on an EPR4 system. In alternative implementations, the algorithms can be modified to be used in PR4 and $E^2PR4$ systems using the same technique of identifying error propagation next to the isolated peaks of the synchronization and resynchronization marks.

In the described implementations, described implementations assumed that data was encoded using as 16/17 code for which each codeword starts and ends with no more than three zeros and three ones, where two patterns 101010101 and 010101010 are excluded and each codeword contains a peak 010 was used. In alternative embodiments, the synchronization and resynchronization methods described in the present invention can be applied to other encoding schemes and at different m/n rates of encoding. Still further, other symbols may be used for the synchronization (S') and resynchronization (RS) symbols than those values described herein.

The logic described in FIGS. 3, 4, and 5 described specific operations as occurring in a particular order. In alternative implementations, certain of the logic operations may be performed in a different order, modified or removed and still implement preferred embodiments of the present invention. Morever, steps may be added to the above described logic and still conform to implementations of the invention.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing synchronization in a binary data stream, compnsing:
   receiving the binary data stream;
   generating a synchronization mark having at least one isolated peak into at least one point in the binary data stream;
   forming an encoded data stream by concatenating the synchronization mark with the received binary data stream; and
   during decoding, detecting the synchronization mark based on error propagation occurring adjacent to the at least one isolated peak of the synchronization mark.

2. The method of claim 1, further comprising:
   concatenating the received binary data stream with a known pattern.

3. The method of claim 2, wherein the known pattern comprises a Variable Frequency Oscillator (VFO) pattern having a sequence of "10".

4. The method of claim 3, wherein the synchronization mark is determined by concatenating a synchronization symbol with the VFO pattern.

5. The method of claim 3, wherein forming the encoded data stream by concatenating the synchronization mark with the received binary data stream further comprises:

concatenating the synchronization mark with at least one bit from the VFO pattern to obtain a modified synchronization pattern having more bits than the synchronization mark.

6. The method of claim 1, further comprising:
concatenating the received binary data stream with at least one resynchronization mark, wherein the at least one resynchronization mark is located in the middle of the received binary data stream and the resynchronization mark and the encoded binary data stream are different.

7. The method of claim 6, further comprising:
detecting the at least one resynchronization mark to verify that the decoding process is operating correctly.

8. The method of claim 1, wherein a data section of the received binary data stream is encoded at an encoding rate of m/n.

9. The method of claim 8, wherein the synchronization mark comprises 01000100001010001 and the m/n encoding rate comprises a 16/17 encoding rate.

10. The method of claim 8, wherein the data section is encoded at the encoding rate of m/n and a resynchronization mark comprises a fixed plurality of bits equivalent to bytes of the encoded binary data stream.

11. The method of claim 10, wherein the resynchronization mark comprises 1000000000100000000001000000000001 and the m/n encoding rate comprises a 16/17 encoding rate.

12. The method of claim 1, wherein detecting the synchronization mark comprises detecting an even number of 1s between peaks an error pattern "101" around a peak.

13. A system for providing synchronization in a binary data stream, comprising:
means for receiving the binary data stream;
means for generating a synchronization mark having at least one isolated peak into at least one point in the binary data stream;
means for forming an encoded data stream by concatenating the synchronization mark with the received binary data stream; and
means for during decoding, detecting the synchronization mark based on error propagation occurring adjacent to the at least one isolated peak of the synchronization mark.

14. The system of claim 13, further conprising: means for concatenating the received binary data stream with a known pattern.

15. The system of claim 14, wherein the known pattern comprises a Variable Frequency Oscillator (VFO) pattern having a sequence of "10".

16. The system of claim 15, wherein the synchronzation mark is determined by concentenating a synchronization symbol with the VFO pattern.

17. The system of claim 15, wherein the means for forming the encoded data stream by concatenating the synchronization mark with the received binary data stream further concatenates the synchronization mark with at least one bit from the VFO pattern to obtain a modified synchronization pattern having more bits than the synchronization mark.

18. The system of claim 13, further comprising:
means for concatenating the received binary data stream with at least one resynchronization mark, wherein the at least one resynchronization mark is located in the middle of the received binary data stream and the resynchronization mark and the encoded binary data stream are different.

19. The system of claim 18, further comprising:
means for detecting the at least one resynchronization mark to verify that the decoding process is operating correctly.

20. The system of claim 13, wherein a data section of the received binary data stream is encoded at an encoding rate of m/n.

21. The system of claim 20, wherein the synchronization mark comprises 01000100001010001 and the m/n encoding rate comprises a 16/17 encoding rate.

22. The system of claim 20, wherein the data section is encoded at the encoding rate of m/n and a resynchronization mark comprises a fixed plurality of bits equivalent to bytes of the encoded binary data stream.

23. The system of claim 22, wherein the resynchronization mark comprises 1000000000100000000001000000000001 and the m/n encoding rate comprises a 16/17 encoding rate.

24. The system of claim 13, wherein the means for detecting the synchronization mark detects an even number of 1s between peaks and a error pattern "101" around a peak.

25. The system of claim 13, further comprising:
an Input/Output I/O device, wherein the system for providing the synchronization is implemented in the I/O device.

26. The system of claim 25, wherein the I/O device comprises a magnetic tape drive.

27. An article of manufacture including code for providing synchronization in a binary data stream, wherein the code causes operations to be performed comprising:
receiving the binary data stream;
generating a synchronization mark having at least one isolated peak into at least one point in the binary data stream;
forming an encoded data stream by concatenating the synchronization mark with the received binary data stream; and
during decoding, detecting the synchronization mark based on error propagation occurring adjacent to the at least one isolated peak of the synchronization mark.

28. The article of manufacture of claim 27, further comprising:
concatenating the received binary data system with a known pattern.

29. The article of manufacture of claim 28, wherein the known pattern comprises a Variable Frequency Oscillator (VFO) pattern having a sequence of "37".

30. The article of manufacture of claim 29, wherein the synchronization mark is determined by concatenating a synchronization symbol with the VFO pattern.

31. The article of manufacture of claim 29, wherein forming the encoded data stream by concatenating the synchronization mark with the received binary data stream further comprises:
concatenating the synchronization mark with at least one bit from the VFO pattern to obtain a modified synchronization pattern having more bits than the synchronization mark.

32. The article of manufacture of claim 27, further comprising:
concatenating the received binary data stream with at least one synchronization mark, wherein the at least one resynchronization mark is located in the middle of the received binary data stream and the resynchronization mark and the encoded binary data stream are different.

33. The article of manufacture of claim 32, further comprising:
  detecting the at least one resynchronization mark to verify that the decoding process is operating correctly.

34. The article of manufacture of claim 27, wherein a data section of the received binary data stream is encoded at an encoding rate of m/n.

35. The article of manufacture of claim 34, wherein the synchronization mark comprises 01000100001010001 and the m/n encoding rate comprises a 16/17 encoding rate.

36. The article of manufacture of claim 34, wherein the data section is encoded at the encoding rate of m/n and a resynchronization mark comprises a fixed plurality of bits equivalent to bytes of the encoded binary data stream.

37. The article of manufacture of claim 36, wherein the resynchronization mark comprises 10000000001000000000100000000000 and the m/n encoding rate comprises a 16/17 encoding rate.

38. The article of manufacture of claim 27, wherein detecting the synchronization mark comprises detecting an even number of 1s between peaks and an error pattern "101" around a peak.

* * * * *